United States Patent
Ooms et al.

(10) Patent No.: US 6,204,357 B1
(45) Date of Patent: Mar. 20, 2001

(54) DOUBLE METAL CYANIDE CATALYSTS FOR PREPARING POLY-ETHERPOLYOLS

(75) Inventors: Pieter Ooms; Jörg Hofmann, both of Krefeld; Pramod Gupta, Bedburg, all of (DE); Lambertus Groenendaal, Grubbenvorst (NL)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/500,840

(22) Filed: Feb. 10, 2000

(30) Foreign Application Priority Data

Feb. 19, 1999 (DE) .............................................. 199 06 985

(51) Int. Cl.$^7$ ............................ C08G 65/00; B01J 27/26; B01J 31/06; C07D 301/00

(52) U.S. Cl. .......................... 528/409; 502/152; 502/153; 502/154; 502/155; 502/156; 502/159; 502/175; 502/200; 549/512; 549/513; 549/518; 549/539; 568/617; 568/622; 568/623; 568/624

(58) Field of Search ................................... 502/152, 153, 502/154, 155, 156, 159, 172, 175, 200; 549/512, 513, 518, 539; 568/617, 622, 623, 624; 528/403, 405, 408, 409, 410, 411, 412, 413, 414, 415, 416

(56) References Cited

U.S. PATENT DOCUMENTS

| | | |
|---|---|---|
| 3,404,109 | 10/1968 | Milgrom . |
| 3,829,505 | 8/1974 | Herold . |
| 3,941,849 | 3/1976 | Herold . |
| 4,302,340 * | 11/1981 | Sandler et al. .................... 428/921 |
| 5,158,922 | 10/1992 | Hinney et al. .................... 502/175 |
| 5,470,813 | 11/1995 | Le-Khac ............................ 502/175 |
| 5,545,601 | 8/1996 | Le-Khac ............................ 502/156 |
| 5,627,120 | 5/1997 | Le-Khac ............................ 502/156 |
| 5,637,673 | 6/1997 | Le-Khac ............................ 528/405 |
| 5,714,428 | 2/1998 | Le-Khac ............................ 502/159 |
| 5,789,626 | 8/1998 | Le-Khac ............................ 568/602 |
| 5,998,327 | 12/1999 | Hofmann et al. ................. 502/175 |

FOREIGN PATENT DOCUMENTS

| | | |
|---|---|---|
| 0 743 093 | 11/1996 | (EP) . |
| 0 700 949 | 3/1999 | (EP) . |
| 4-145123 | 5/1992 | (JP) . |

OTHER PUBLICATIONS

J. Chem. Soc., Faraday Trans., 1996, Bd. 92, Nr. 4, (Month Unavailable) pp. 645–650, XP–000906958, Godinez et al, "Electrochemical and $^1$H NMR Studies on the Complexation of Hexacyanoferrrate(II) Anions by Aminocyclodextrins".
Tetrahedron Letters, vol. 31, No. 29, 1990 (Month Unavailable), pp. 4101–4104, XP000906959, Lee et al, "The Hydridopentacyanocobaltate Anion Induced Deoxygenation of Allylic Alcohols Using β–Cyclodextrin as a Phase Transfer Agent".

* cited by examiner

*Primary Examiner*—Elizabeth D. Wood
(74) *Attorney, Agent, or Firm*—Joseph C. Gil; N. Denise Brown; Carolyn M. Sloane

(57) ABSTRACT

The invention is directed to new double metal cyanide (DMC) catalysts, a process for the preparation of these catalysts, and to a process for the preparation of polyetherpolyols by the polyaddition of alkylene oxides to starter compounds which contain active hydrogen atoms, wherein the catalyst comprises the novel double metal cyanide (DMC) catalyst of the present invention. These new double metal cyanide (DMC) catalysts comprise a) one or more double metal cyanide compounds, b) one or more organic complex ligands, and c) one or more cyclodextrins, with the proviso that b) and c) are different compounds. The catalysts of this invention exhibit greatly increased activity during preparation of a polyetherpolyol.

13 Claims, No Drawings

DOUBLE METAL CYANIDE CATALYSTS FOR PREPARING POLY-ETHERPOLYOLS

BACKGROUND OF THE INVENTION

The invention relates to new double metal cyanide (DMC) catalysts, to a process for the preparation of these new double metal cyanide catalysts, to a process for the preparation of polyetherpolyols by the polyaddition of alkylene oxides to starter compounds which contain active hydrogen atoms in the presence of these new double metal cyanide catalysts, and to the polyetherpolyols produced by this process.

Double metal cyanide (DMC) catalysts for the polyaddition of alkylene oxides to starter compounds containing active hydrogen atoms are known and described in, for example, U.S. Pat. Nos. 3,404,109, 3,829,505, 3,941,849 and 5,158,922. The use of these DMC catalysts for preparing polyetherpolyols causes, in particular, a reduction in the proportion of monofunctional polyethers with terminal double bonds, i.e., the so-called monools, as compared with the conventional preparation of polyetherpolyols using conventional alkali metal catalysts such as, for example, alkali metal hydroxides. The polyetherpolyols obtained in this way may be processed to produce high quality polyurethanes (e.g., elastomers, foams, coatings).

DMC catalysts are, in general, usually obtained by reacting an aqueous solution of a metal salt with an aqueous solution of a metal cyanide salt in the presence of an organic complex ligand such as, for example, an ether. In a typical catalyst preparation, for example, aqueous solutions of zinc chloride (in excess) and potassium hexacyanocobaltate are mixed and then dimethoxyethane (glyme) is added to the suspension produced. After filtering and washing the catalyst with an aqueous glyme solution, an active catalyst of the general formula:

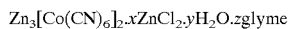

$$Zn_3[Co(CN)_6]_2 \cdot xZnCl_2 \cdot yH_2O \cdot zglyme$$

is obtained (see, for example, EP-A 700 949).

Other DMC catalysts are disclosed in, for example, JP-A 4 145 123, U.S. Pat. No. 5,470,813, EP-A 700 949, EP-743 093, EP-A 761 708 and WO 97/40086, which are described as further reducing the proportion of monofunctional polyethers with terminal double bonds during the preparation of polyetherpolyols by using tertiary butanol as the organic complex ligand. Tertiary butanol can be used either alone, or combined with a polyether (see, for example, EP-A 700 949, EP-A 761 708, and WO 97/40086). In addition, the induction time during the polyaddition reaction of alkylene oxides with corresponding starter compounds is reduced and the catalyst activity is increased by the use of these DMC catalysts.

The object of the present invention was to provide improved DMC catalysts for the polyaddition of alkylene oxides to corresponding starter compounds which exhibit additionally increased catalytic activity as compared with the currently known catalyst types. This leads to improved economic viability of the method for the preparation of polyetherpolyols due to the shortened alkoxylation times. Ideally, as a result of this increased catalytic activity, the catalyst can then be used in such small concentrations (i.e., 25 ppm or less) that the costly procedure required to separate the catalyst from the product is no longer necessary and the resultant polyetherpolyol product can be used directly for polyurethane production.

Surprisingly, it has now been found that DMC catalysts which contain a cyclodextrin as an additional complex ligand exhibit greatly increased activity during the process for the production of polyetherpolyols.

SUMMARY OF THE INVENTION

The present invention provides a double metal cyanide (DMC) catalyst comprising:

a) one or more, preferably one, double metal cyanide compounds, b) one or more, preferably one, organic complex ligands, and c) one or more, preferably one, cyclodextrins, with the proviso that b) the organic complex ligand and c) the cyclodextrin are different compounds.

The double metal cyanide catalyst of the invention may additionally comprise d) water, preferably in an amount of from 1 to 10% by weight related to the total weight of the resultant DMC catalyst, and/or e) one or more water-soluble metal salts, preferably in an amount of from 5 to 25% by weight related to the total weight of the resultant DMC catalyst, which correspond to the formula (I):

$$M(X)_n \tag{I}$$

from the preparation of the double metal cyanide compounds a). In formula (I) above, M: represents one of the following metals Zn(II), Fe(II), Ni(II), Mn(II), Co(II), Sn(II), Pb(II), Fe(III), Mo(IV), Mo(VI), Al(III), V(V), V(IV), Sr(II), WV(IV), W(VI), Cu(II) and Cr(III), with Zn(II), Fe(II), Co(II) and Ni(II) being particularly preferred;

each X: represents an anion which may be the same or different (preferably the same), with the anions preferably being selected from the group consisting of halides, hydroxides, sulfates, carbonates, cyanates, thiocyanates, isocyanates, isothiocyanates, carboxylates, oxalates and nitrates; and n: represents 1, 2 or 3.

The double metal cyanide compounds a) contained in the catalysts according to the present invention comprise the reaction products of water-soluble metal salts and water-soluble metal cyanide salts.

To prepare a) the double metal cyanide compounds, it is preferred that component e), the water-soluble metal salts, correspond to the general formula (I):

$$M(X)_n, \tag{I}$$

wherein:

M: represents a metal selected from the group consisting of Zn(II), Fe(II), Ni(II), Mn(II), Co(II), Sn(II), Pb(II), Fe(III), Mo(IV), Mo(VI), Al(III), V(V), V(IV), Sr(II), W(IV), W(VI), Cu(II) and Cr(III), and is more preferably a metal selected from the group consisting of Zn(II), Fe(II), Co(II) and Ni(II);

each X: represents an anion which may be the same or different (preferably all X's are the same), with X preferably being selected from the group of halides, hydroxides, sulfates, carbonates, cyanates, thiocyanates, isocyanates, isothiocyanates, carboxylates, oxalates and nitrates; and n: represents 1, 2 or 3.

Some examples of water-soluble metal salts suitable for the present invention include compounds such as zinc chloride, zinc bromide, zinc acetate, zinc acetylacetonate, zinc benzoate, zinc nitrate, iron(II) sulfate, iron(II) bromide, iron(II) chloride, cobalt(II) chloride, cobalt(II) thiocyanate, nickel(II) chloride and nickel(II) nitrate. Mixtures of different water-soluble metal salts may also be used in the present invention.

To prepare double metal cyanide compounds a), it is preferred that the water-soluble metal cyanide salts correspond to the general formula (II):

$$(Y)_a M'(CN)_b (A)_c,\qquad\text{(II)}$$

wherein:
M': represents a metal selected from the group consisting of Fe(II), Fe(III), Co(II), Co(III), Cr(II), Cr(III), Mn(II), Mn(III), Ir(III), Ni(II), Rh(III), Ru(II), V(IV) and V(V), and is more preferably selected from the group consisting of Co(II), Co(III), Fe(II), Fe(III), Cr(III), Ir(III) and Ni(II);
each Y: represents a cation and may be the same or different (preferably the same), with the cations being selected from the group consisting of the alkali metal ions and alkaline earth metal ions;
each A: represents an anion and may the same or different (preferably the same), with the anions being selected from the group consisting of halides, hydroxides, sulfates, carbonates, cyanates, thiocyanates, isocyanates, isothiocyanates, carboxylates, oxalates and nitrates; and
the subscripts a, b and c: each represent an integer with the values being individually selected such that the metal cyanide salt is electrically neutral;
wherein:
a: preferably represents 1, 2, 3 or 4;
b: preferably represents 4, 5 or 6; and
c: preferably represents 0.

The water-soluble metal cyanide salts may contain one or more of the metals described as being suitable for M' above including Fe(II), Fe(III), Co(II), Co(III), Cr(II), Cr(III), Mn(II), Mn(III), Ir(III), Ni(II), Rh(III), Ru(II), V(IV), V(V), and various mixtures thereof.

Examples of some suitable compounds to be used as double metal cyanide salts in the present invention include compounds such as potassium hexacyanocobaltate(III), potassium hexacyanoferrate(II), potassium hexacyanoferrate(III), calcium hexacyanocobaltate(III) and lithium hexacyanocobaltate(III).

Preferred double metal cyanide compounds a), which are present in the DMC catalysts of the present invention include compounds corresponding to the general formula (III):

$$M_x[M'_{x'}(CN)_y]_z\qquad\text{(III)}$$

wherein:
M: represents a metal selected from the group consisting of Zn(II), Fe(II) Ni(II), Mn(II), Co(II), Sn(II), Pb(II), Fe(III), Mo(IV), Mo(VI), Al(III), V(V), V(IV), Sr(II), W(IV), W(VI), Cu(II) and Cr(III), and preferably a metal selected from the group consisting of Zn(II), Fe(II), Co(II) and Ni(II);
M': represents a metal selected from the group consisting of Fe(II), Fe(III), Co(II), Co(III), Cr(II), Cr(III), Mn(II), Mn(III), Ir(III), Ni(II), Rh(III), Ru(II), V(IV) and V(V), and is particularly preferably selected from the group consisting of Co(II), Co(III), Fe(II), Fe(III), Cr(III), Ir(III) and Ni(II); and
x, x', y and z: each represent an integer and are selected such that the double metal cyanide compound is electrically neutral. It is preferred that: x=3, x'=1, y=6 and z=2.

A particularly preferred embodiment of the double metal cyanide compounds a) corresponding to formula (III) is wherein: x is 3, x' is 1, y is 6 and z is 2; M represents Zn(II), Fe(II), Co(II) or Ni(II); and M' represents Co(III), Fe(III), Cr(III) or Ir(III).

Examples of suitable double metal cyanide compounds a) include compounds such as zinc hexacyanocobaltate(III), zinc hexacyanoiri-date(III), zinc hexacyanoferrate(III) and cobalt(II) hexacyanocobaltate(III). Additional examples of suitable double metal cyanide compounds are described in, for example, U.S. Pat. No. 5,158,922, the disclosure of which is herein incorporated by reference. Zinc hexacyanocobaltate(III) is most preferably used as the double metal cyanide compound a) in the present invention.

The organic complex ligands b) present in the DMC catalysts according to the invention are known in principle, and are described in detail in the prior art in, for example, U.S. Pat. Nos. 5,470,813, 5,158,922, 3,404,109, 3,829,505, and U.S. Pat. No. 3,941,849, the disclosures of which are herein incorporated by reference, as well as in, for example, EP-A 700,949, EP-A 761,708, JP-A 4,145,123, EP-A 743,093 and WO 97/40086. Preferred organic complex ligands are water-soluble, organic compounds containing heteroatoms such as, for example, oxygen, nitrogen, phosphorus and/or sulfur, which are capable of producing complexes with a double metal cyanide compound a). Other suitable organic complex ligands include, for example, various alcohols, aldehydes, ketones, ethers, esters, amides, urea, nitriles, sulfides and mixtures thereof. Particularly preferred organic complex ligands are water-soluble aliphatic alcohols such as, for example, ethanol, isopropanol, n-butanol, isobutanol, sec-butanol and tert-butanol. Tert-butanol is most preferred.

The organic complex ligand is added either during preparation of the catalyst suspension, after formation of the suspension, or immediately after the precipitation of the double metal cyanide compound a) from the suspension. During the preparation of the catalyst, the organic complex ligand can be added as part of the aqueous solution in which the water soluble metal salt is reacted with the water soluble metal cyanide salt; or it can be added (optionally with water) to the resulting suspension formed by this reaction in the aqueous solution. In general, an excess of the organic complex ligand is used.

DMC catalysts according to the invention contain the double metal cyanide compounds a) in amounts of about 20 to about 90% by weight, preferably of from about 25 to about 80% by weight, based on the total weight of the final catalyst; and contain the organic complex ligands b) in amounts of about 0.5 to about 30%, preferably of about 1 to about 25% by weight, based on the total weight of the final catalyst.; and contain the cyclodextrins, component c), in amounts of about 1 to about 80% by weight, preferably of about 1 to about 40% by weight, based on the total weight of the resultant catalyst.

The sum of the %'s by weight of components a), b) and c) and, optionally d) and/or e), totals 100% by weight of the catalyst.

Cyclodextrins c) which are suitable for the preparation of the DMC catalysts according to the invention include compounds such as, for example, unsubstituted cyclodextrins or their ester, alkylether, hydroxyalkylether, alkoxycarbonylalkylether and carboxyalkylether derivatives, and the salts thereof. Cyclodextrins are cyclohexa-, cyclohepta-, or cyclooctaamyloses with six (6), seven (7), or eight (8) 1,4-linked glucose units which are produced during the degradation of starch by Bacillus macerans or Bacillus circulans under the effects of cyclodextrin glycosyl.

Carboxylic acid components which are suitable for the production of cyclodextrin esters include, for example, aryl-, aralkyl- and alkylcarboxylic acids with 2 to 30 carbon atoms, preferably 2 to 24 carbon atoms, and more preferably 2 to 20 carbon atoms. It is preferred that these are aralkyl- and/or alkylcarboxylic acids, with alkylcarboxylic acids being most preferred.

Alkyl components which are suitable for the production of cyclodextrin alkylethers, hydroxyalkylethers, alkoxycarbonylalkylether and/or carboxyalkylethers include, for example, linear or branched alkyl groups with 1 to 30 carbon atoms, preferably 1 to 24 carbon atoms, and most preferably 1 to 20 carbon atoms.

Cyclodextrins which are preferably used as component c) in the present invention include the α-, β- and γ-cyclodextrins and their mono-, di- and tri-ethers, mono-, di- and tri-esters, or monoester/diethers, which are generally obtained by the etherification of α-, β- and γ-cyclodextrins with suitable alkylating agents such as, for example, dimethyl sulfate or alkyl halides which have from 1 to 30 carbon atoms and include compounds such as, for example, methyl-, ethyl-, propyl-, butyl-, pentyl, hexyl-, heptyl- and octyl-chloride, -bromide or -iodide, and/or esterification with acetic acid or succinic acid in the presence of strong acids.

Preferred cyclodextrins for the present invention include, for example, methyl-α-cyclodextrin, methyl-β-cyclodextrin, methyl-γ-cyclodextrin, ethyl-β-cyclodextrin, butyl-α-cyclodextrin, butyl-β-cyclodextrin, butyl-γ-cyclodextrin, 2,6-dimethyl-α-cyclodextrin, 2,6-dimethyl-β-cyclodextrin, 2,6-dimethyl-γ-cyclodextrin, 2,6-diethyl-β-cyclodextrin, 2,6-dibutyl-β-cyclodextrin, 2,3,6-trimethyl-α-cyclodextrin, 2,3,6-trimethyl-β-cyclodextrin, 2,3,6-trimethyl-γ-cyclodextrin, 2,3,6-trioctyl-α-cyclodextrin, 2,3,6-trioctyl-β-cyclodextrin, 2,3,6-triacetyl-α-cyclodextrin, 2,3,6-triacetyl-β-cyclodextrin, 2,3,6-triacetyl-γ-cyclodextrin, (2-hydroxy)-propyl-α-cyclodextrin, (2-hydroxy)propyl-β-cyclodextrin, (2-hydroxy)propyl-γ-cyclodextrin and partly or completely acetylated and/or succinylated α-, β- or γ-cyclodextrin, 2,6-dimethyl-3-acetyl-β-cyclodextrin or 2,6-dibutyl-3-acetyl-β-cyclodextrin.

Methods of preparing cyclodextrins are generally well-known and are described in detail in, for example, "Römpp Lexikon Chemie", 10th edition, Stuttgart/New York 1997, p.845 et seq. and Chemical Reviews 98 (1998) 1743.

Mixtures of any of the previously mentioned cyclodextrins may also be used in the present invention.

Analysis of the catalyst composition is conventionally performed using elemental analysis, thermogravimetry or extractive removal of the cyclodextrin followed by gravimetric determination.

Catalysts according to the invention may be crystalline, partially crystalline or amorphous. Analysis of the crystallinity is conventionally performed by powder X-ray diffractometry.

Catalysts according to the invention preferably comprise
a) zinc hexacyanocobaltate(III) as a double metal cyanide compound,
b) tert-butanol as an organic complex ligand, and
c) a cyclodextrin.

The present invention also relates to a process for the preparation of double metal cyanide (DMC) catalysts as described above. This process, generally speaking, comprises (1) reacting α) one or more metal salts, and, in particular, which correspond to formula (I) as set forth hereinabove, with one or more metal cyanide salts, and, in particular, which correspond to formula (II) as set forth hereinabove, in an aqueous solution. The aqueous solution may also optionally contain β) one or more organic complex ligands b) and/or γ) one or more cyclodextrins.

In a preferred embodiment, the aqueous solutions of the metal salt (for example, zinc chloride, used in a stoichiometric excess, i.e., at least 50 mol % with respect to the metal cyanide salt) and the metal cyanide salt (for example, potassium hexacyanocobaltate) are first reacted in the presence of the organic complex ligand b) (for example, tert-butanol), wherein a suspension is produced which contains the double metal cyanide compound a) (e.g., zinc hexacyanocobaltate), water d), excess metal salt e) and the organic complex ligand b).

The organic complex ligand b) may be present in the aqueous solution of the metal salt and/or the metal cyanide salt, or it may be added directly to the suspension obtained either before or after precipitation of the double metal cyanide compound a). It has proven advantageous to mix the aqueous solutions and the organic complex ligand b) under vigorous stirring. The resulting suspension is then, typically, treated with the cyclodextrin c). The cyclodextrin c) is preferably used in a mixture with water and/or additional organic complex ligand b).

The catalyst is then isolated from the suspension using known techniques such as, for example, centrifuiging or filtration. In a preferred specific variant, the isolated catalyst is then washed with an aqueous solution of the organic complex ligand b) (for example, by resuspension, followed by renewed isolation by means of filtration or centrifuging). (Washing of the isolated catalyst is, however, optional.) In this way for example, water-soluble secondary products such as potassium chloride can be removed from the catalyst of the present invention. Finally, the isolated catalyst is dried.

The amount of organic complex ligand b) present in the aqueous wash solution is preferably between 40 and 80% by weight, with respect to the total solution. Furthermore, it is advantageous to add some cyclodextrin c) to the aqueous wash solution, preferably such that cyclodextrin is present in the range of between 0.5 and 5% by weight, with respect to the total solution.

In addition, it is advantageous to wash the catalyst more than once. In this case, for example, the first wash process may be repeated. However, it is preferable to use non-aqueous solutions for further wash processes, for example, mixtures of the organic complex ligand b) and cyclodextrin c) without water.

The washed catalyst is then dried, optionally after being powdered, at temperatures of, in general, 20 to 100° C. and at pressures of, in general, 0.1 mbar to standard pressure (1013 mbar).

The present invention also relates to a process for the preparation of polyether polyols comprising reacting, via polyaddition, alkylene oxides to suitable starter compounds which contain active hydrogen atoms in the presence of the novel double metal cyanide (DMC) catalysts according to the invention.

The alkylene oxides used in this process are preferably ethylene oxide, propylene oxide, butylene oxide and mixtures thereof. The building up of the polyether chain by alkoxylation may be performed, for example, with only one monomeric epoxide, or randomly or blockwise with two or three different monomeric epoxides. More details are described in and may be obtained from "Ullmans Encyclopädie der industriellen Chemie", Vol A 21, 1992, p.670 et seq.

Suitable starter compounds which contain active hydrogen atom include, preferably, compounds with (number average) molecular weights of about 18 to about 2,000 and which contain from about 1 to about 8 hydroxyl groups. The following compounds may be mentioned by way of example: ethylene glycol, diethylene glycol, triethylene glycol, 1,2-propylene glycol, 1,4-btianediol, hexamethylene glycol. bisphenol A, trimethylolpropane, glycerol, pentaerythritol, sorbitol, cane sugar degraded starch or water.

Advantageously, those starter compounds which contain active hydrogen atoms are used which have been prepared for example by conventional alkali catalysis from the previously mentioned low molecular weight starters and oligomeric alkoxylation products with (number average) molecular weights of about 200 to about 2,000.

The polyaddition of alkylene oxides to starter compounds which contain active hydrogen atoms is catalyzed by the novel double metal cyanide (DMC) catalysts according to the invention, in general, at temperatures of from 20 to 200° C., preferably in the range of from 40 to 180° C., and in particular at temperatures of from 50 to 150° C. The reaction may be performed at total pressures of 0 to 20 bar. The polyaddition may be performed either in bulk or in an inert, organic solvent such as toluene and/or THF. The amount of solvent is typically 10 to 30% by weight, with respect to the amount of polyetherpolyol being prepared.

The catalyst concentration is chosen so that, under the given reaction conditions, effective control of the polyaddition reaction is possible. The catalyst concentration is generally in the range of from 0.0005% by weight to 1% by weight, preferably in the range of from 0.001% by weight to 0.1% by weight, more preferably in the range of from 0.001 to 0.0025% by weight, with respect to the amount of polyetherpolyol being prepared.

The (number average) molecular weight of the polyetherpolyols prepared by the process according to the invention is in the range from 500 to 100,000 g/mole, preferably in the range from 1,000 to 50,000 g/mole, and most preferably in the range from 2,000 to 20,000 g/mole.

The polyaddition reaction may be performed either continuously or batchwise, e.g., in a batch or semi-batch process.

Catalysts according to the invention may be used in very low concentrations (i.e., 25 ppm and lower, with respect to the amount of polyetherpolyol being prepared) due to their greatly increased activity. If polyetherpolyols prepared in the presence of catalysts according to the invention are used to prepare polyurethanes (as described in, for example, Kunststoffhandbuch, Vol. 7, Polyurethane, 3rd Edition, 1993, p.25–32 and 57–67), there is no need to remove the catalyst from the polyetherpolyol and this does not have a detrimental effect on the product quality of the polyurethane obtained.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all percentages are percentages by weight.

EXAMPLES

Catalyst Preparation

Example A

Preparation of a DMC catalyst using 2,6-dimethyl-β-cyclodextrin (Catalyst A)

A solution of 12.5 g (91.5 mmol) of zinc chloride in 20 ml of distilled water was added to a solution of 4 g (12 mmol) of potassium hexacyanoc baltate in 70 ml of distilled water with vigorous stirring (24,000 rpm), which resulted in a suspension. Immediately afterwards, a mixture of 50 g of tert-butanol and 50 g of distilled water was added to the suspension, and then stirred vigorously (24,000 rpm) for 10 min. Then, a mixture of 1 g of a 2,6-dimethyl-β-cyclodextrin Beta W7 M 1.8 (Wacker-Chemie GmbH D-81737 Munich), 1 g of tert-butanol and 100 g of distilled water was added and stirred (1,000 rpm) for 3 min. The solid was isolated by filtering, then stirred (10,000 rpm) for 10 min with a mixture of 70 g of tert-butanol, 30 g of distilled water and 1 g of the 2,6-dimethyl-β-cyclodextrin as described above, and then filtered again. Finally, the product was stirred again (10,000 rpm) for 10 min with a mixture of 100 g of tert-butanol and 0.5 g of the 2,6-dimethyl-β-cyclodextrin (described above). After filtration, the catalyst was dried to constant weight at 50° C. and atmospheric pressure.

Yield of dry, powdered catalyst: 5.4 g

Elemental analysis, thermogravimetric analysis and extraction:

Cobalt=10.5% by wt., zinc=24.4% by wt., tert-butanol= 10.0% by wt., 2,6-dimethyl-β-cyclodextrin=13.8% by wt.

Example B

Preparation of a DMC catalyst using 2,6-dimethyl-α-cyclodextrin (Catalyst B)

The same procedure as described above in Example A was used to prepare Catalyst B, with the exception that 2,6-dimethyl-α-cyclodextrin Alpha W6 M 1.8 (Wacker-Chemie GmbH, D-81737 Munich) was used instead of the 2,6-dimethyl-β-cyclodextrin in Example A.

Yield of dry, powdered catalyst: 5.5 g

Elemental analysis, thermogravimetric analysis and extraction:

Cobalt=11.0 wt. %, zinc=25.7 wt. %, tert-butanol=4.4 wt. %, 2,6-dimethyl-α-cyclodextrin=12.3 wt. %.

Example C

Preparation of a DMC catalyst using 2,3,6-triacetyl-β-cyclodextrin (Catalyst C)

The same procedure as described above in Example A was used to prepare Catalyst C, with the exception that 2,3,6-triacetyl-β-cyclodextrin Beta W7 TA 30 (Wacker-Chemie GmbH, D-817317 Munich) was used instead of the 2,6-dimethyl-β-cyclodextrin in Example A.

Yield of dry, powdered catalyst: 4.9 g

Elemental analysis, thermogravimetric analysis and extraction:

Cobalt=13.4 wt. %, zinc=29.6 wt. %, tert-butanol=11.4 wt.%, 2,3,6-triacetyl-β-cyclodextrin=6.4 wt. %.

Example D

Preparation of a DMC catalyst using γ-cyclodextrin (Catalyst D)

The same procedure as described above in Example A was used to prepare Catalyst D, with the exception that γ-cyclodextrin (Fluka Chemie AG, CH-9471 Buchs) was used instead of the 2,6-dimethyl-β-cyclodextrin in Example A.

Yield of dry, powdered catalyst: 6.0 g

Elemental analysis, thermogravimetric analysis and extraction:

Cobalt=10.2 wt.%, zinc=23.9 wt. %, tert-butanol=9.9 wt. %, γ-cyclodextrin=15.0wt. %.

Example E

Preparation of a DMC catalyst using 2,3-dimethyl-γ-cyclodextrin (Catalyst E)

The same procedure as described above in Example A was used to prepare Catalyst E, with the exception that 2,6-dimethyl-γ-cyclodextrin Gamma W8 M 1.8 (Wacker-Chemie GmbH, D-81737 Munich) was used instead of the 2,6-dimethyl-β-cyclodextrin in Example A.

Yield of dry, powdered catalyst: 5.5 g

Elemental analysis, thermogravimetric analysis and extraction:

Cobalt=12.7 wt. %, zinc=30.0 wt. %, tert-butanol=10.1 wt. %, 2,6-dimethyl-γ-cyclodextrin=11.1 wt. %.

Example F (Comparison Example)

Preparation of a DMC catalyst using tert-butanol without a cyclodextrin (Catalyst F; synthesis in accordance with JP-A 4,145,123)

A solution of 10 g (73.3 mmol) of zinc chloride in 15 ml of distilled water was added to a solution of 4 g (12 mmol) of potassium hexacyanocobaltate in 75 ml of distilled water with vigorous stirring (24,000 rpm), which resulted in a suspension. Immediately afterwards, a mixture of 50 g of tert-butanol and 50 g of distilled water was added to the suspension produced and then stirred vigorously (24,000 rpm) for 10 min. The solid was isolated by filtering, then stirred (10,000 rpm) for 10 min with 125 g of a mixture of tert-butanol and distilled water (70/30; w/w), and filtered again. The product was then stirred again (10,000 rpm) for 10 min with 125 g of tert-butanol. After filtration, the catalyst was dried to constant weight at 50° C. and atmospheric pressure.

Yield of dry, powdered catalyst: 3.08 g

Elemental analysis:

Cobalt=13.6 wt. %, zinc=27.4 wt. %, tert-butanol=14.2 wt. %.

Preparation of Polyetherpolyols
General Method 50 g of polypropylene glycol starter (number average molecular weight=1,000 g/mol) and 4 to 5 mg of catalyst (20 to 25 ppm, based on the theoretical amount of polyetherpolyol being prepared) were initially introduced into a 500 ml pressurized reactor under a protective gas (argon) and heated to 105° C. with stirring. Then, propylene oxide (ca. 5 g) was added in one portion until the total pressure increased to 2.5 bar. Additional propylene oxide was only added when an accelerated pressure drop was observed in the reactor. (This accelerated pressure drop indicates that the catalyst has been activated.) Then, the remainder of the propylene oxide (145 g) was added continuously at a constant total pressure of 2.5 bar. After addition of all the propylene oxide and a 2 hour post-reaction period at 105° C., volatile components were distilled off at 90° C. (1 mbar) and the mixture was then cooled to room temperature.

The polyetherpolyols produced by this process were characterized by determination of the OH values, the double bond content and the viscosities.

The reaction was followed by means of a time/conversion curve (propylene oxide consumption [g] versus reaction time [min]). The induction time was determined from the point of interception of the tangent to the steepest point of the time/conversion curve with the extended base line of the curve. The propoxylation times which are critical for catalyst activity correspond to the period between catalyst activation (i.e., the end of the induction period) and the end of propylene oxide addition. The total reaction time equals the sum of the induction and propoxylation times.

Example 1

Preparation of a polyetherpolyol with Catalyst A (20 ppm)

Using the general procedure described above, Polyetherpolyol 1 was prepared with 20 ppm of Catalyst A. The reaction times for the preparation of this polyetherpolyol and characterization of the product are set forth below.

| | | |
|---|---|---|
| Induction time: | | 197 min |
| Propoxylation time: | | 281 min |
| Total reaction time: | | 478 min |
| Polyetherpolyol: | OH value (mg of KOH/g): | 29.9 |
| | Double bond content (mmol/kg): | 8 |
| | Viscosity at 25° C. (mPa · s): | 1022 |

Without removal of the catalyst, the metal content in Polyetherpolyol 1 was: Zn=5 ppm, Co=3 ppm.

Example 2

Preparation of a polyetherpolyol with Catalyst B (25 ppm)

Using the general procedure described above, Polyetherpolyol 2 was prepared with 25 ppm of Catalyst B. The reaction times for the preparation of this polyether polyol and characterization of the product are set forth below.

| | | |
|---|---|---|
| Induction time: | | 175 min |
| Propoxylation time: | | 319 min |
| Total reaction time: | | 494 min |
| Polyetherpolyol: | OH value (mg of KOH/g): | 30.3 |
| | Double bond content (mmol/kg): | 10 |
| | Viscosity at 25° C. (mPa · s): | 889 |

Example 3

Preparation of a polyetherpolyol with Catalyst C (25 ppm)

Using the general procedure described above, Polyetherpolvol 3was prepared with 25 ppm of Catalyst C. The reaction times for the preparation of this polyetherpolyol and characterization of the product are set forth below.

| | |
|---|---|
| Induction time: | 173 min |
| Propoxylation time: | 384 min |

-continued

| Total reaction time: | | 557 min |
|---|---|---|
| Polyetherpolyol: | OH value (mg of KOH/g): | 30.7 |
| | Double bond content (mmol/kg): | 8 |
| | Viscosity at 25° C. (mPa · s): | 926 |

Example 4

Preparation of a polyetherpolyol with Catalyst D (25 ppm)

Using the general procedure described above, Polyetherpolyol 4 was prepared with 25 ppm of Catalyst D. The reaction times for the preparation of this polyetherpolyol and characterization of the product are set forth below.

| Induction time: | | 213 min |
|---|---|---|
| Propoxylation time: | | 215 min |
| Total reaction time: | | 428 min |
| Polyetherpolyol: | OH value (mg of KOH/g): | 30.0 |
| | Double bond content (mmol/kg): | 8 |
| | Viscosity at 25° C. (mPa · s): | 901 |

Example 5

Preparation of a polyetherpolyol with Catalyst E (25 ppm)

Using the general procedure described above, Polyetherpolvol 5 was prepared with 25 ppm of Catalyst E. The reaction times for the preparation of this polyetherpolyol and characterization of the product are set forth below.

| Induction time: | | 213 min |
|---|---|---|
| Propoxylation time: | | 414 min |
| Total reaction time: | | 627 min |
| Polyetherpolyol: | OH value (mg of KOH/g): | 30.3 |
| | Double bond content (mmol/kg): | 9 |
| | Viscosity at 25° C. (mPa · s): | 931 |

Example 6

Using the general procedure described above, the preparation of another polyetherpolyol was attempted with 25 ppm of Catalyst F. However, Catalyst F (25 ppm) exhibited no activity at all under the reaction conditions described in the general procedure above, even after 10 hours induction time.

Examples 1–5 above show that the new DMC catalysts according to the invention can be used in such small concentrations during the preparation of polyetherpolyols, due to their greatly increased activity that it is now no longer necessary to separate the DMC catalyst from the prepared polyetherpolyol.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A double metal cyanide (DMC) catalyst comprising
   a) one or more double metal cyanide compounds,
   b) one or more organic complex ligands, and
   c) one or more cyclodextrins,
with the proviso that component b) and component c) are different compounds.

2. The double metal cyanide (DMC) catalyst of claim 1, which additionally comprises
   d) water, and/or
   e) one or more water-soluble metal salts.

3. The double metal cyanide (DMC) catalyst of claim 1, wherein a) said double metal cyanide compound comprises zinc hexacyanocobaltate(III).

4. The double metal cyanide (DMC) catalyst of claim 1, wherein b) said organic complex ligand comprises tert-butanol.

5. The double metal cyanide (DMC) catalyst of claim 1, wherein c) said cyclodextrin is present in amount of from 1 to 80% by weight, based on the total weight of the catalyst.

6. The double metal cyanide (DMC) catalyst of claim 1, wherein c) said cyclodextrin is present in an amount of from 1 to 40% by weight, based on the total weight of the catalyst.

7. The double metal cyanide (DMC) catalyst of claim 1, wherein c) said cyclodextrin is selected from the group consisting of 2,6-dimethyl-α-cyclodextrin, 2,6-dimethyl-β-cyclodextrin, 2,6-dimethyl-γ-cyclodextrin, 2,3,6-trimethyl-β-cyclodextrin, acetyl-β-cyclodextrin, 2,3,6-triacetyl-α-cyclodextrin, 2,3,6-triacetyl-β-cyclodextrin, 2,3,6-triacetyl-γ-cyclodextrin.

8. A process for the preparation of a double metal cyanide (DMC) catalyst, comprising:
   (1) reacting
      α) one or more water soluble metal salts with one or more metal cyanide salts, and in an aqueous solution to form a suspension;
   (2) isolating the catalyst from the suspension; and
   (3) drying the catalyst;
wherein β) one or more organic complex ligands are added during step (1) as part of the aqueous solution and/or after step (1), and optionally after step (2); and the suspension formed in (1) is treated with γ) one or more cyclodextrins which are optionally present as a mixture with water and/or β) one or more organic complex ligands; with the proviso that component β) and component γ) are different compounds.

9. The process of claim 8, wherein β) one or more organic complex ligands are added after step (1) as part of the aqueous solution; and the suspension formed in step (1) is treated with γ) one or more cyclodextrins which are present as a mixture with water and/or β) one or more organic complex ligands.

10. The process of claim 8, wherein the isolated catalyst is washed with a mixture comprising at least two compounds selected from the group consisting of (i) one or more organic complex ligands, (ii) water, and (iii) one or more cyclodextrins, to form a suspension; followed by isolating the catalyst from the suspension; and drying the catalyst.

11. The process of claim 8, wherein said organic complex ligand comprises tert-butanol.

12. The process of claim 8, wherein said cyclodextrin is selected from the group consisting of 2,6-dimethyl-α-cyclodextrin, 2,6-dimethyl-β-cyclodextrin, 2,6-dimethyl-γ-cyclodextrin, 2,3,6-trimethyl-β-cyclodextrin, acetyl-β-cyclodextrin, 2,3,6-triacetyl-α-cyclodextrin, 2,3,6-triacetyl-β-cyclodextrin, 2,3,6-triacetyl-γ-cyclodextrin and mixtures thereof.

13. In a process for the preparation of polyetherpolyols by the polyaddition of alkylene oxides to starter compounds which contain active hydrogen atoms in the presence of a catalyst, the improvement wherein the catalyst comprises the double metal cyanide (DMC) catalyst of claim 1.

* * * * *